United States Patent
Morrison et al.

(10) Patent No.: US 10,579,158 B2
(45) Date of Patent: Mar. 3, 2020

(54) INFORMATION HANDLING SYSTEM PREDICTIVE KEY RETRACTION AND EXTENSION ACTUATION

(71) Applicant: Dell Products L.P., Round Rock, TX (US)

(72) Inventors: Jason S. Morrison, Cedar Park, TX (US); Mark S. Sears, Georgetown, TX (US); Robert D. Hrehor, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 15/800,821

(22) Filed: Nov. 1, 2017

(65) Prior Publication Data

US 2019/0129515 A1    May 2, 2019

(51) Int. Cl.
*G06F 3/02* (2006.01)
*G06F 1/16* (2006.01)
*H01H 13/84* (2006.01)
*G06F 1/20* (2006.01)
*G06F 3/023* (2006.01)

(52) U.S. Cl.
CPC .......... *G06F 3/0221* (2013.01); *G06F 1/1662* (2013.01); *G06F 1/1666* (2013.01); *G06F 1/1677* (2013.01); *G06F 1/203* (2013.01); *G06F 1/206* (2013.01); *G06F 3/023* (2013.01); *H01H 13/84* (2013.01)

(58) Field of Classification Search
USPC .............. 345/166, 168, 169, 170, 172, 619; 362/85
See application file for complete search history.

(56) References Cited

U.S. PATENT DOCUMENTS

| | | | |
|---|---|---|---|
| 5,898,599 A | 4/1999 | Massie | |
| 6,016,423 A | 1/2000 | Ross | |
| 6,292,172 B1 | 9/2001 | Makhlouf | |
| 6,894,678 B2 | 5/2005 | Rosenberg | |
| 7,701,445 B2 | 4/2010 | Inokawa | |
| 2002/0069483 A1 | 6/2002 | Savolainen | |
| 2005/0128108 A1 | 6/2005 | Fong | |
| 2005/0206622 A1* | 9/2005 | Cote | G06F 1/1626 345/169 |
| 2007/0025097 A1* | 2/2007 | Cheng | G06F 1/1616 362/85 |
| 2007/0247429 A1* | 10/2007 | Westerman | G06F 3/0219 345/168 |

(Continued)

*Primary Examiner* — Thuy N Pardo
(74) *Attorney, Agent, or Firm* — Zagorin Cave LLP; Robert W. Holland

(57) ABSTRACT

An information handling system integrated keyboard selectively retracts and extends keys based upon detected conditions, such as housing configuration, housing motion and end user indications. Extension and retraction shuttle plates motivated by actuator wires moves a sliding plate to extended and retracted positions that define the key positions. Nickel titanium alloy actuator wires shorten upon application of current to pull the shuttle plates to the extended or retracted positions that are maintained by a lock. Limit switches remove current at detection of a desired shuttle plate position. One or more controllers manage actuator wire operation based upon detected conditions and actuator wire temperature and electrical characteristics.

16 Claims, 8 Drawing Sheets

(56) References Cited

U.S. PATENT DOCUMENTS

| | | | |
|---|---|---|---|
| 2008/0284734 A1* | 11/2008 | Visser | G06F 3/038 |
| | | | 345/166 |
| 2009/0315830 A1* | 12/2009 | Westerman | G06F 3/0219 |
| | | | 345/168 |
| 2010/0321298 A1* | 12/2010 | Tsai | G06F 1/1662 |
| | | | 345/168 |
| 2012/0013639 A1* | 1/2012 | Simons | G06F 1/1662 |
| | | | 345/619 |
| 2013/0044049 A1 | 2/2013 | Biggs | |
| 2013/0321213 A1 | 12/2013 | Huang | |
| 2014/0184415 A1 | 7/2014 | Edmonds | |
| 2014/0184515 A1* | 7/2014 | Willner | G06F 1/1624 |
| | | | 345/169 |
| 2014/0253453 A1* | 9/2014 | Lo | G06F 3/0488 |
| | | | 345/168 |
| 2016/0098097 A1* | 4/2016 | Chang | G06F 3/0221 |
| | | | 345/169 |
| 2018/0218859 A1* | 8/2018 | Ligtenberg | G06K 9/00375 |
| | | | 345/169 |

* cited by examiner

INFORMATION HANDLING SYSTEM PREDICTIVE KEY RETRACTION AND EXTENSION ACTUATION

CROSS REFERENCE TO RELATED APPLICATIONS

U.S. patent application Ser. No. 15/800,810, entitled "Information Handling System Integrated Device Key Actuator" by inventors Jason S. Morrison. Adolfo S. Montero. and Laurent A. Regimbal, filed on even date herewith, describes exemplary methods and systems and is incorporated by reference in its entirety.

U.S. patent application Ser. No. 15/800,829, entitled "Information Handling System Integrated Device Actuator Monitoring" by inventors Jason S. Morrison and Mark S. Sears, filed on even date herewith, describes exemplary methods and systems and is incorporated by reference in its entirety.

BACKGROUND OF THE INVENTION

Field of the Invention

The present invention relates in general to the field of portable information handling system management, and more particularly to a portable information handling system predictive key retraction and extension actuation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically integrate input/output systems and a power source to support use of the system without any fixed resources, such as external peripherals and power. For example, convertible information handling systems typically have main and lid portions rotationally coupled to each other to open for use and close for portability. A typical convertible information handling system integrates a display in the lid housing portion that presents visual images to an end user. Processing components disposed in the main housing portion generally process information to create visual information for presentation to a user at the display. For example, a central processing unit (CPU) executes instructions to generate visual information that a graphics processing unit (GPU) processes into pixel values for generation of visual images at the display. An end user interacts with the information handling system through the visual images, such as by inputting information through a touchscreen, mouse or keyboard. A typical convertible information handling system integrates a keyboard and touchpad in the upper surface of the main housing so that an end user can make inputs when the lid housing portion rotates to an open position and exposes the main housing portion upper surface. When the lid portion rotates approximately ninety degrees, the display is held in a viewing position with the keyboard arranged to accept inputs. In some embodiments, the lid portion rotates 360 degrees to a tablet configuration that allows an end user to more comfortably interact with a touchscreen to make inputs.

Generally, portable information handling system dimensions are driven by the size of the display integrated in the portable housing. Portable information handling systems with larger displays tend to have more room to integrate more powerful processing components and larger storage devices, such as solid state drives (SSD) and additional random access memory. As display size shrinks, typically performance tradeoffs are made due to the reduced room within the housing to fit in the processing components. However, even in portable systems that have large displays, end users typically desire to have housings with minimal height dimensions and weight. Information handling system manufacturers minimize system height by selecting low profile components and using care in component placement within the housing so that adequate cooling is available.

A keyboard integrated into a housing offers convenience with the ability to more readily perform inputs when an end user is on the go. Generally, typed inputs made at a keyboard with physically-moving keys provide feedback to the end user that makes information handling system interactions more user friendly. However, physically-moving keys tend to add vertical height to the information handling system so that the keys have sufficient room to move up and down. Often the keyboard keys are built into a recess formed in the upper surface of the main housing portion so that the lid housing portion can rotate to a closed position over the keys. One alternative for reducing vertical height of a portable system having an integrated keyboard is to reduce the amount of key travel supported by the keys, however, reducing key travel changes the end user experience and tends to decrease input speeds and accuracy. Another alternative for reducing portable system height with an integrated keyboard is to retract the keys into the portable housing when closing the system lid housing portion. A difficulty with retraction of keys is that a mechanical or electromechanical actuator that typically retracts and extends the keys tends to add size and presents a point of failure after repeated uses. For example, a retraction mechanism typically must overcome a key biasing mechanism that bias keyboard keys upward, which tends to create mechanical stress that wears both the retraction and biasing mechanisms.

SUMMARY OF THE INVENTION

Therefore, a need has arisen for a system and method which retracts and extends keyboard keys in an automated manner with a minimal height structure.

A further need exists for a system and method which manages current application to actuate shape memory wire for retracting and extending keyboard keys in a repeatable manner.

A further need exists for a system and method which monitors current applied to actuate shape memory wire for correct temperature transitions.

In accordance with the present invention, a system and method are provided which substantially reduce the disadvantages and problems associated with previous methods and systems for retracting and extending keyboard keys of an information handling system. Current applied to shape memory wire actuates keyboard retraction and/or extension with a low height structure. Rapid and reliable motion induced by shape memory wire contraction slides a plate relative to the keyboard to retracted and extended positions maintained between actuations with bistable retracted or extended states. For example, "maglev" keys bias to the extended or retracted positions based upon keyboard sliding plate orientation. Alternatively, a lock or latch maintains the keyboard sliding plate configuration to overcome key biasing devices, such as rubber domes. A keyboard manager/controller applies current based upon detected conditions and manages current application to ensure desired keyboard behavior with reduced wire wear.

More specifically, an information handling system processes information with processing components disposed in a housing, such as a housing having main and lid portions rotationally coupled to each other. For example, a processor and memory in the main portion cooperate to execute instructions that generate visual information presented on a display integrated in the lid portion. An end user interacts with the visual information through a keyboard, such as a keyboard integrated in the main housing portion upper surface. A keyboard manager monitors conditions related to the keyboard to selectively retract and extend the keyboard keys by applying current to actuator wires. For example, a first set of plural actuator wires shorten in response to application of current to pull a first shuttle that slides a plate relative to the key board from an extended to a retracted position, where a magnet latch holds the plate in place. For instance, with "maglev" keys, the plate interacts with the keys to change an upward bias to a downward bias and pull the keys in. Alternatively, with a rubber dome upward biasing device, the plate actuation overcomes an upward bias of the rubber domes and pull the keys into the main housing portion to be held in place with a magnet latch or similar device. A second set of plural actuator wires shorten in response to application of current to pull a second shuttle that slides a plate relative to the keyboard to an extended position that changes the downward bias to an upward bias to lift the keys upward and out of the housing. Alternatively with rubber dome key biasing, the plate releases the keys to bias upward and out of the main housing portion. The keyboard manager monitors actuator wire current, temperature, resistance and position to achieve desired retracted and extended positions. For example, actuator wire resistance is sampled before application of actuation current to ensure wire continuity and anticipated heating. Actuator wire temperature is sampled to detect transitions between austenite and martensite phases that trigger wire shortening and return to pre-heating length. For example, application of current to actuator wires is restricted so that actuation of keys in one direction does not pull on actuator wires for the other direction until a phase change to a greater length has taken place. For instance, housing portion rotation is monitored for relative position and rate of change so that keyboard key actuation occurs as needed by the end user without unnecessary or excessive actuation wire use.

The present invention provides a number of important technical advantages. One example of an important technical advantage is that an information handling system keyboard's keys are rapidly and efficiently retracted into the information handling system housing with an integrated structure having minimal height. Retraction and extension shuttles couple to retraction and extension actuator wires that selectively shorten to pull the shuttles relative to the keyboard. The shuttles engage a sliding plate, such as through a shoulder screw or other engagement point, which interacts with the keys to retract or extend the keys in a rapid, predictable manner with minimal moving parts. Upon reaching a desired extension or retraction location, the sliding plate locks in place, such as with a magnetic locking device that is overcome by a subsequent actuator wire movement. In one embodiment, the sliding plate and actuator wire assembly has a height of less than key travel so that overall impact of including the key retraction structure is to reduce the height of the information handling system since retraction of the keys in a closed configuration results in a reduced total height of the main housing. Actuator wires made of shape memory alloys, such as nickel titanium, endure repeated actuations to offer a robust system readily monitored through the electrical and physical properties of the wires, such as resistance and temperature changes in response to current application. Rapid reactions initiated by current application to the actuator wires provides precise implementation of key extensions and retractions based upon detected conditions for an excellent user experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system keyboard's keys retract and extend with application of current to actuator wires based upon detected conditions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
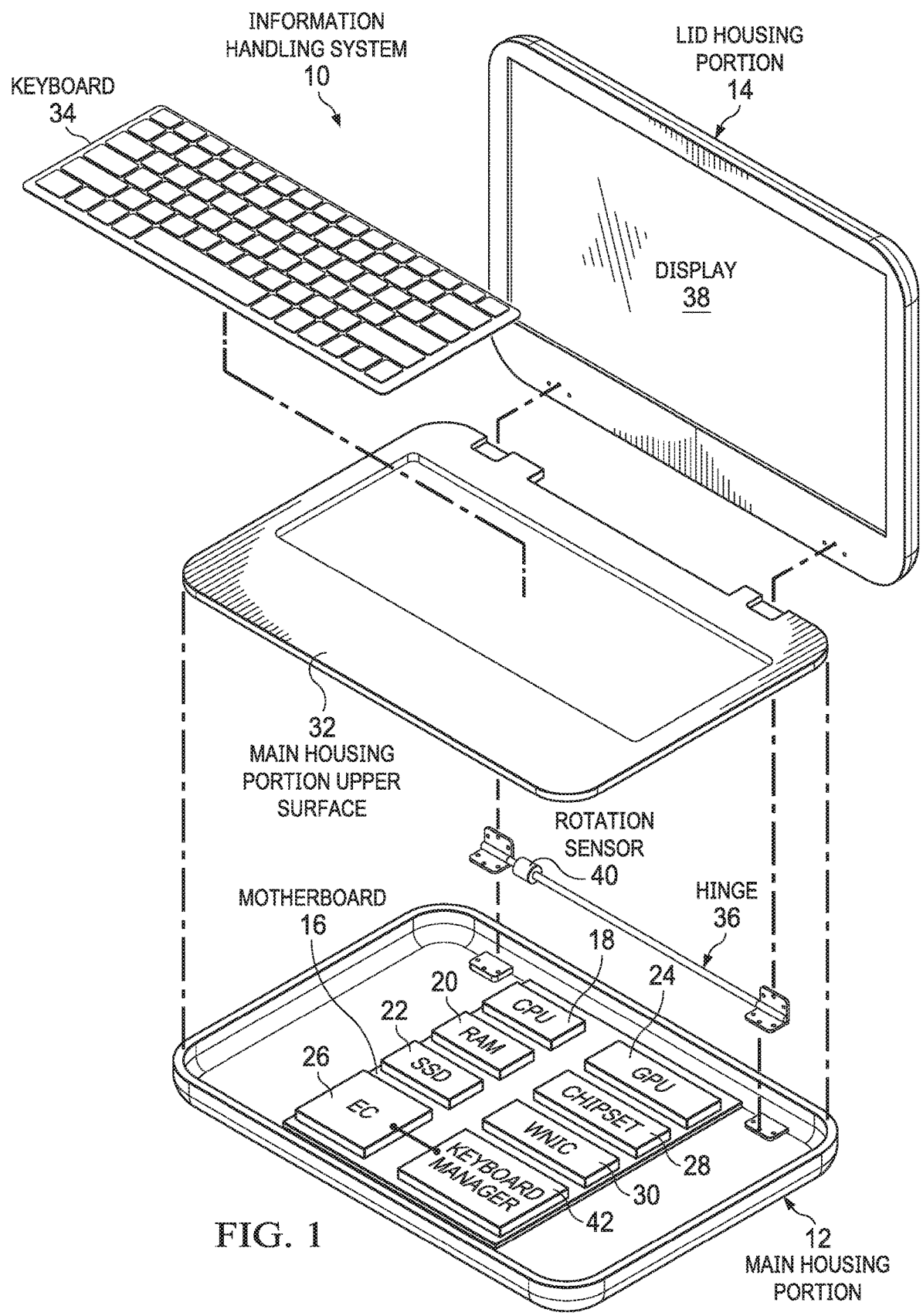
FIG. 1 depicts an exploded view of an information handling system having a keyboard with keys retracted and extended by a keyboard manager.

Referring now to FIG. 1, an exploded view depicts an information handling system 10 having a keyboard 34 with keys 68 retracted and extended by a keyboard manager 42. In the example embodiment, information handling system 10 is a portable system having a convertible configuration that rotates between a closed position and a variety of open positions, such as with 90 degrees of rotation to a clamshell orientation or 360 degrees of rotation to a tablet configuration. A main housing portion 12 provides a base that contains processing components to process information. A lid housing portion 14 integrates a display 38 and rotationally couples to the main housing portion with a hinge 36 to support rotation of the housing portions relative to each other. In the example embodiment, the processing components include a motherboard 16 coupled to main housing portion 12 and supporting communication between a central processing unit (CPU) 18 and random access memory (RAM) 20. Processor 18 executes instructions in cooperation with RAM 20, such as instructions associated with an operating system and applications stored in persistent memory, such as a solid state drive 22. Information generated by processor 18 is provided to a graphics processor unit (GPU) 24 to generate pixels values that define visual images presented at display 38. A chipset 28 having a variety of processors, controllers and firmware manages physical interactions between the processing components, such as to provide networking through a wireless network interface card (WNIC) 30. An embedded controller 26 manages power and input/output device interactions, such as inputs made by and end user at keyboard 34 or other devices, such as a touchpad or mouse. The example embodiment depicts a portable information handling system having rotationally coupled housing portions, however, alternative embodiments may include other types of configurations, including a peripheral keyboard that separates from an information handling system.

In the example embodiment, a main housing portion upper surface 32 covers the processing components and integrates keyboard 34 having selectively retractable keys 68. With lid housing portion 14 rotated to a viewing position, such as 90 degrees of rotation relative to main housing portion 12, keys 68 extend upwards to accept end user keyed inputs. To make an input, an end user presses on a key 68 to depress the key into main housing portion 12 and contact a sensor that detects the input. During normal operations, keys 68 bias upwards and provide resistance against input presses so that an end user has a natural feedback when typing at keyboard 34. As lid portion 14 rotates to a closed position over top of keyboard 34, all of keys 68 retract into the interior of main housing portion 12 so that keys 68 do not prevent closing of lid housing portion 14 against upper surface 32. By retracting keys 68 into main housing portion 12, less height is consumed for keyboard 34 integration into information handling system 10, resulting in a shorter and lighter weight system. In the example embodiment, a rotation sensor 40 tracks rotational movement of hinge 36 and reports the movement to a keyboard manager 42. Keyboard manager 42 applies the movement to determine whether to retract or extend keys 34. For example, rapid rotation from an open to the closed positions of the housing portions initiates key retraction at a larger angle than more slow rotation so that keys 34 retract with sufficient time to enter into main housing 12 before lid housing portion 14 hits keys 34. As another example, rotation from a closed position towards an open position detected by rotation sensor 40 allows keyboard manager 42 to wait until a stabilized housing portion configuration is reached with the stopping of rotation before extending keys 34. In the example embodiment, keyboard manager 42 executes embedded code as a dedicated controller, however, in alternative embodiments functional control by keyboard manager 42 may include instructions executed across a variety of hardware devices, such as an embedded code module executing on embedded controller 26. Additional example embodiments and key extension/retraction conditions are set forth in greater detail by the examples set forth below.

Figure 2:
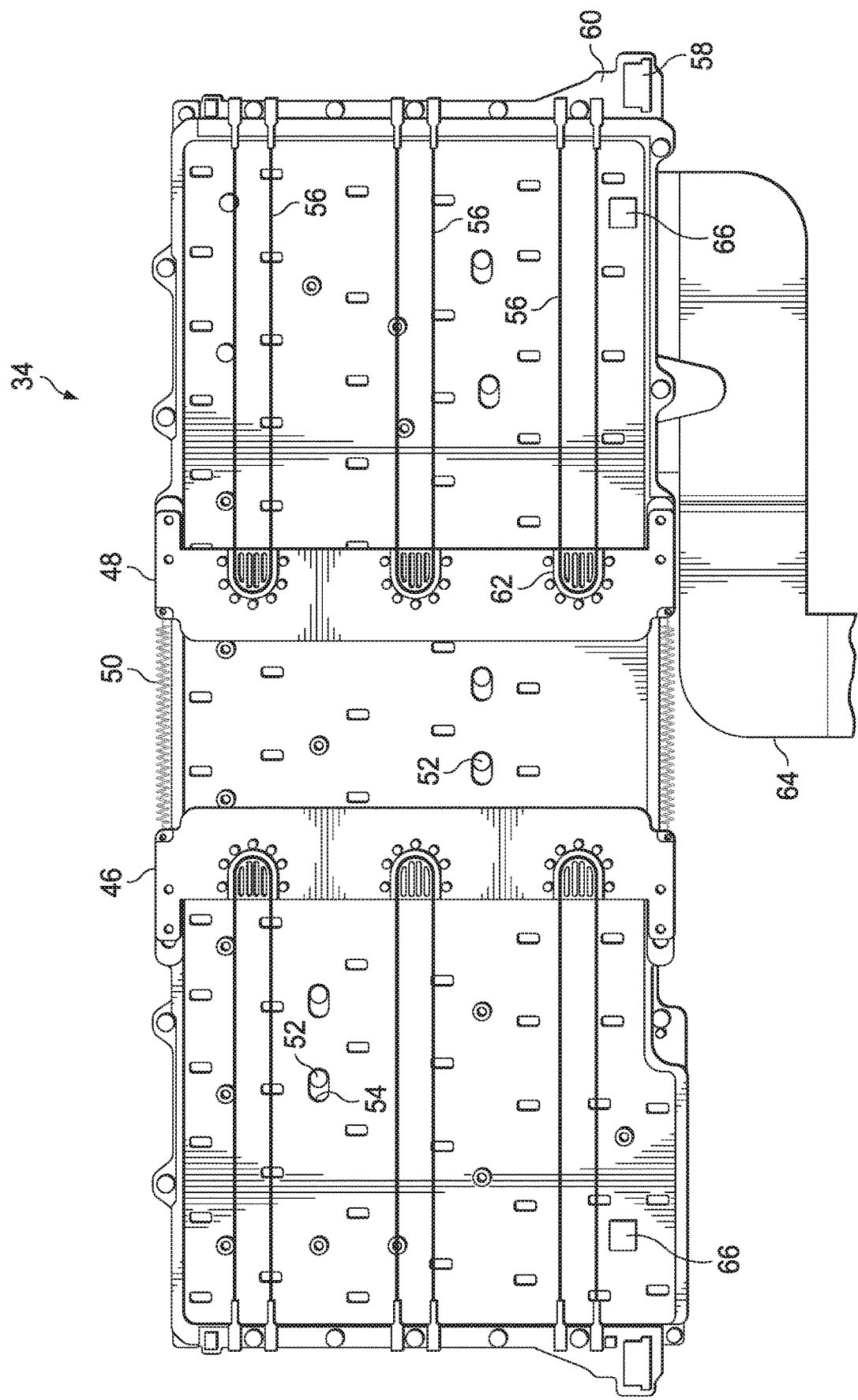
FIG. 2 depicts a bottom view of a keyboard having keyboard extension and retraction managed by actuation wires.

Referring now to FIG. 2, a bottom view depicts a keyboard 34 having keyboard extension and retraction managed by actuation wires 56. In the example embodiment, an extension shuttle 46 actuates to place the keyboard keys in an extended configuration and a retraction shuttle 48 actuates to place the keyboard keys in a retracted configuration. Extension shuttle 46 couples to three actuation wires 56 with each actuation wire connected to a keyboard manager circuit board 60 that has a fixed position relative to the keyboard 34. Each actuation wire wraps in a loop around an actuation wire anchor 62 integrated in extension shuttle 46. One end of each actuation wire provides a current connection and the other end provides a ground so that a current passed from keyboard manager circuit board 60 runs to ground resulting in heating of the actuation wire. A keyboard manager controller 58 provides current to the three actuation wires 56 when key extension is desired. As actuation wires 56 heat, shape memory material of the wire, such a nickel titanium alloy material, transitions from martensitic to austenitic phase resulting in a shortening of the length of the wire. The shorter length of actuation wires 56 pulls extension shuttle 46 towards keyboard manager circuit board 60 providing motion that frees keys of keyboard 34 to extend. Retraction shuttle 48 is controlled in a similar manner but opposite direction so that motion of retraction shuttle 48 provides motion to retract keys of keyboard 34.

In the example embodiment, actuation wire anchors 62 are formed as loops that effectively act like a pulley to draw motion of the shuttle on shortening of the wire. For instance, each shuttle has three actuation wire anchors heat staked to it to support three actuation wires. Control for managing actuation of each shuttle is, as an example, passed from an embedded controller through the keyboard flexible circuit connector 64 and then to keyboard manager controllers 58. Motion of shuttles 46 and 48 are translated to the keys through a sliding plate 78 that couples to the bottom of keyboard 34 and slides between the separated keyboard manager circuit boards 60. As a shuttle is activated into motion by its set of actuation wires, the shuttle pulls on sliding plate 78 at shoulder screws 52 or other contact points so that the sliding plate acts to retract or extend keyboard 34 keys. A magnet lock 66 releases sliding plate 78 during activation of a shuttle and then re-engages sliding plate 78 once shuttle-induced motion is completed so that sliding plate 78 stays in the position to which shuttle actuation moved it. Once shuttle 46 or 48 has completed an actuation, a return spring 50 coupled between shuttles 46 and 48 bring both shuttles to a neutral position. In the example embodiment, each shuttle has three actuation wires 56 that shorten to a similar length to provide a uniform pull across the shuttle. In alternative embodiments, more or less wires may be used with different types of routing. For example, a larger loop area on the shuttle provides for a long actuation wire with additional movement provided during shortening. Alternatively, sliding plate 78 may slide longitudinally instead of laterally with actuation wires 56 aligned perpendicular to those of the depicted example embodiment.

Figure 3A:
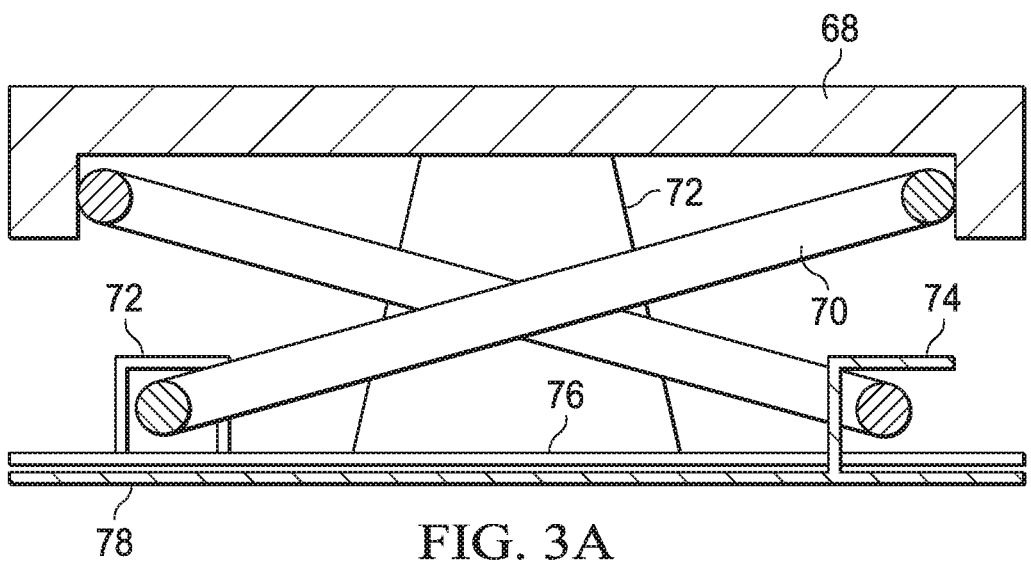
FIGS. 3A, 3B and 3C depict side cutaway views of a keyboard key in an extended position, an input position and a retracted position.
Figure 3B:
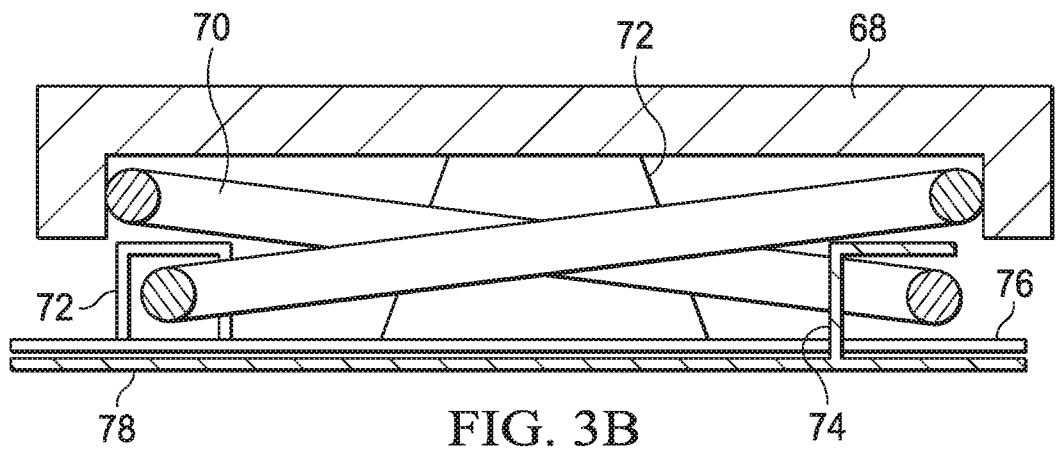
Figure 3C:
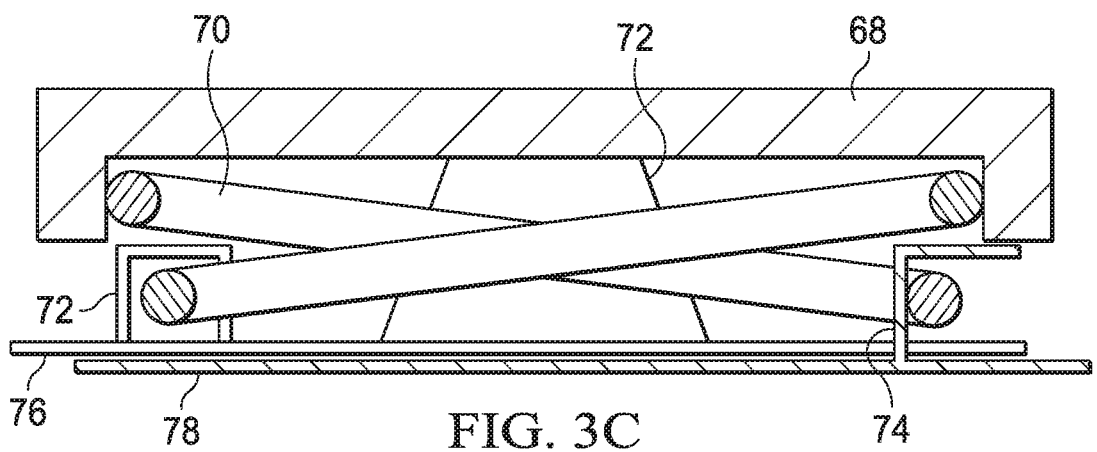

Referring now to FIGS. 3A, 3B and 3C, side cutaway views depict a keyboard key 68 in an extended position, an input position and a retracted position. FIG. 3A depicts key 68 in an extended position biased upwards and away from a detection sensor 76 by a rubber dome 72. A scissors structure 70 guides vertical movement of key 68 during a press by an end user, such as to make an input. Rubber dome 72 provides an upward bias that the end user overcomes during an input so that key 68 makes contact with detection sensor 76 to indicate an input. FIG. 3B illustrates that scissors structure 70 rotates at one end about a fixed coupling location 72 and slides relative to the detection sensor at a slideable coupling location 74 so that contact is made with the detection sensor 76. FIG. 3C illustrates an example embodiment in which sliding plate 78 engages slideable coupling location 74 to pull key 68 to the retracted position. Sliding plate 78 slides in the direction of slideable coupling location 74 so that a member extending upwards from sliding plate 78 engages with scissors 70 to pull scissors 70 to the retracted position. Sliding plate 78 has movement initiated by application of current to the actuator wires and is then locked in place to hold scissors 70 in the retracted position. The upward bias of rubber dome 72 can return key 68 to an extend position if sliding plate 78 is released, however, in the example embodiments a separate actuator wire initiation pulls sliding plate towards fixed coupling location 72 to restore key 68 to the extended position. In alternative embodiments, key 68 may be biased upwards with other types of biasing devices than rubber dome 72 and alternative guiding structures may be used instead of scissors 70 to guide key motion. Actuation of actuator wires with current provide movement to lock and release the keys in various other embodiments by pulling keys to the desired position and locking the keys in place after the actuation.

Figure 4A:
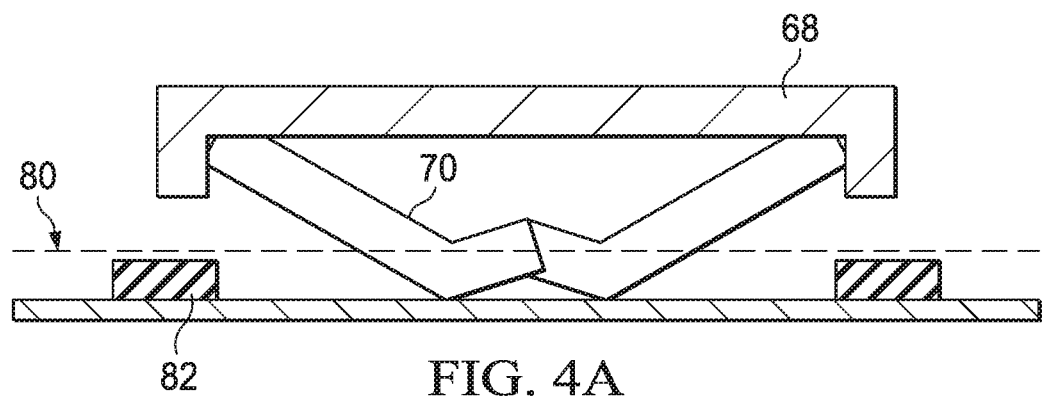
FIGS. 4A, 4B, 4C, and 4D depict side cutaway views of a keyboard key actuated between extended, intermediate and retracted positions to provide normal, ruggedized and stored key positions.
Figure 4B:
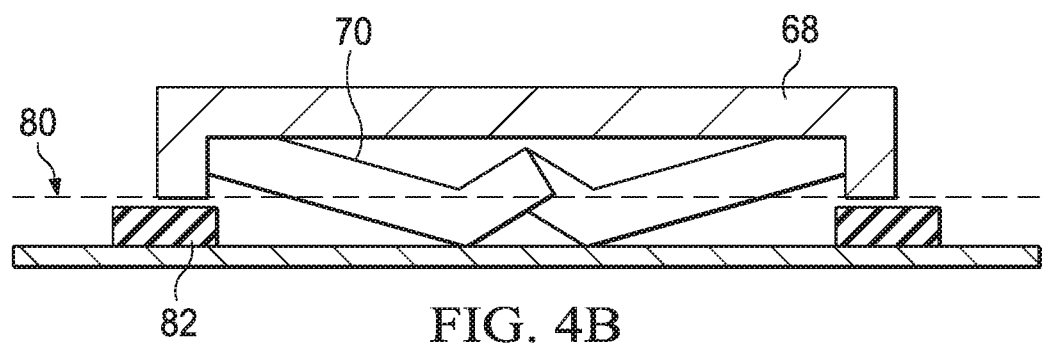
Figure 4C:
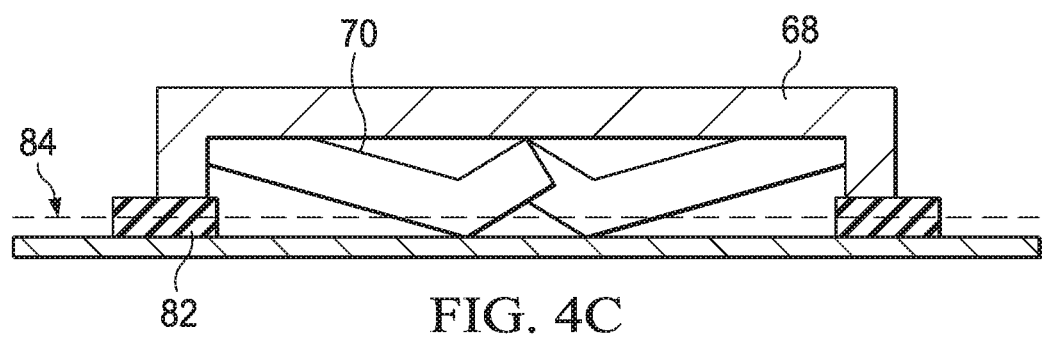
Figure 4D:
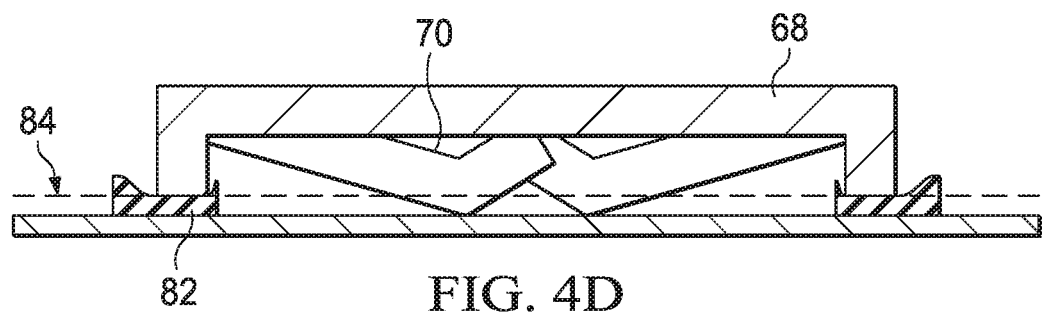

Referring now to FIGS. 4A, 4B, 4C, and 4D, side cutaway views depict a keyboard key actuated between extended, intermediate and retracted positions to provide normal, ruggedized and stored key positions. FIG. 4A depicts an alternative scissors structure 70 that guides key 68 during vertical travel and provides an upwards bias, such as with a spring mechanism integrated in scissors 70 or a "maglev" device. For example, opposing magnet polarities in key 68 and keyboard 76 bias key 68 upwards to an extended position. FIG. 4B illustrates that a press on key 68 results in an input once key 68 travels past a primary switch height 80, roughly at contact with a gasket 82. FIG. 4C illustrates an intermediate position of key 68 established by actuation of an actuation wire to partially move and then lock the sliding plate. For example, moving the "maglev" opposing polarity magnets to align in polarity brings key down from the extended to the intermediate position. At the intermediate position, key 68 contacts gasket 82 to provide a ruggedized solution that prevents water or contaminants from entering outside of key 68 an into the information handling system. As illustrated by FIG. 4D, a secondary detection device switch height 84 provides a key input detection as gasket 82 compresses, thus maintaining a ruggedized configuration while accepting key inputs with reduced vertical motion of key 68. In the example embodiment, multiple sets of actuator wires may be used, such as a first set to maintain the intermediate position of FIG. 4C and a second set to maintain the compressed position of FIG. 4D. Alternatively, the intermediate position illustrated by FIG. 4C may be used to retract keys 68 for storage with some room left between the housing portions in the closed position to allow some extension of keys 68. In alternative embodiments, different sets of actuator wires may be used to establish multiple key heights and may set key heights in plural sets of keys so that only some keys are retracted in response to an actuation. Further, key retraction to the ruggedized mode depicted by FIG. 4C may be supported in an automated manner, such as in response to detection of liquids or other contaminants. Advantageously, with magnet levitated key bias, the magnet devices operate to maintain the sliding plate in positions.

Figure 5:
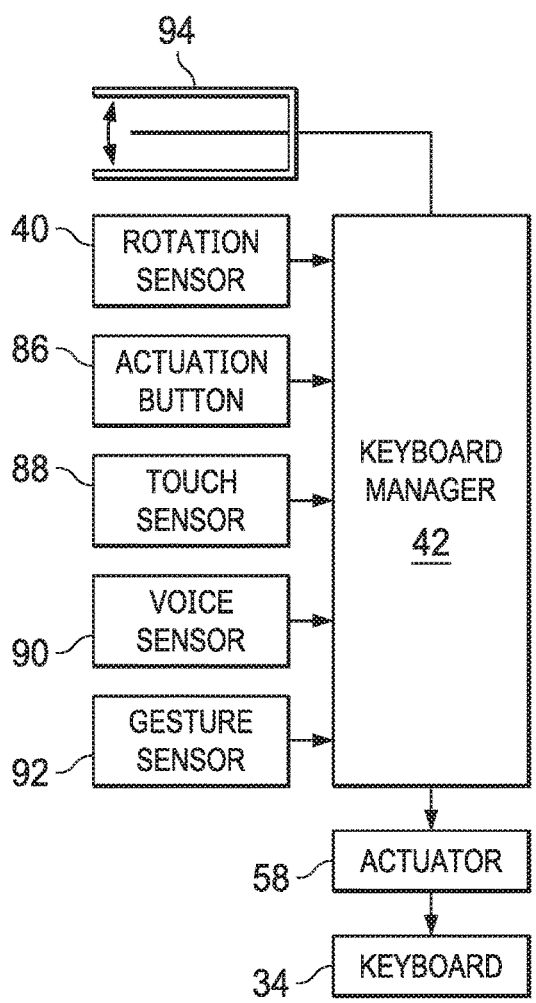
FIG. 5 depicts a block diagram of an information handling system having key retracted and extended positions initiated in response to detected conditions.

Referring now to FIG. 5 depicts a block diagram depicts an information handling system having key retracted and extended positions initiated in response to detected conditions. In the example embodiment, keyboard manager 42 executes as embedded code on an embedded controller having GPIO's to plural sensor devices. Rotation sensor 40 provides the relative rotational orientation of housing portions, such as a lid and main housing portion of a portable system. Rotation sensor 40 may measure the relative position or an axle that supports the housing portion rotation or may measure accelerations, such as with an accelerometer configured as a gyroscope that determine angular orientations relative to gravity. A rate of rotation of the housing portions may be detected and reported by the rotation sensor or determined by keyboard manager 42 based upon changes in reported angular orientations over time. Keyboard manager 42 manages key retraction and extension based upon angular orientation of the housing portions and rate of rotation of the housing portions. For example, if housing portion rotation is detected and keyboard keys are retracted, then keyboard manager 42 awaits for motion of the housing portions to stop before determining whether to extend the keys. For instance, a user typically uses both hands to rotate the housing portions and cannot make intentional keyed inputs while housing portions are rotated, so key extension can wait until motion is complete and the keys are disposed in a configuration that accepts typed inputs. After motion is complete, such as when rotation sensor 40 detects a fixed housing portion rotational orientation, keyboard manager 42 analyzes sensed conditions to determine if the keys should extend. For instance, if a clamshell orientation is detected the keys extend, however, if a tablet configuration is detected, the keys remain retracted so that the keyboard may rest on a surface without having keys extended.

Similar analysis applies when keyboard keys are extended and a user rotates housing portions from an open to a closed position. Keyboard manager 42 will seek to have keyboard retraction occur before keys come into contact with the lid housing portion, however premature key retraction could result in an end user halting housing portion rotation before closing so that that the end user can make inputs. In such a situation, multiple actuations of the actuator wires may result in excessive heating or wear. For example, if actuation to retract keys is quickly followed by actuation to extend keys, the retraction actuator wires may not cool adequately to allow a phase change and wire lengthening so that the extension actuator wires will pull against still-shortened retraction actuator wires. In one embodiment, a minimum time period must pass between applications of current to an actuator wire before another actuation may take place, such as a two second time period. To avoid such situations, retraction of keys upon closing occurs with rotation still in progress and includes analysis of the rate of closing of the housing portions.

Other types of conditions may be analyzed when determining if keys should be retracted or extended. As an example, an actuation button 86 accepts a manual end user input to actuate the keys from a current retracted or extended position to the opposite condition. As other examples, a touch sensor 88, voice sensor 90 or gesture sensor 92 accept end user inputs to define key positions. An air moving device 94 interfaced with keyboard manager 42 provides active cooling airflow to the actuator wires after actuation that allows a more rapid cooling and transition of wire material phase to a lengthened state. Some examples of air moving devices include piezo fan, a piezo blower, a piezo cooler and an electrostatic air mover that uses ionic wind. Generally, such air moving devices vibrate a physical device at a resonant frequency for a short time period to generate air motion. Other types of cooling airflows may also be generated, such as by re-directing system cooling fan airflow for a temporary time period. In one embodiment, actuation of the actuator wires may store mechanical or electric potential energy that is released as a cooling airflow after current is turned off at the actuator wires. Temporary application of a cooling airflow more quickly reduces actuator wire temperature so that subsequent applications of current may take place with a reduced time delay. The actuator wire cooling may be automatically initiated when a physical position change of the sliding plate is detected, such as by triggering a temporary application of power to an air moving device up detection of movement by a limit switch. In one alternative embodiment, a spring loaded fan impeller wound up by movement of the sliding plate releases after actuation to generate a short burst of cooling airflow. Alternatively, a piston charges by motion of the sliding plate to release a cooling airflow after movement is complete.

Figure 6:
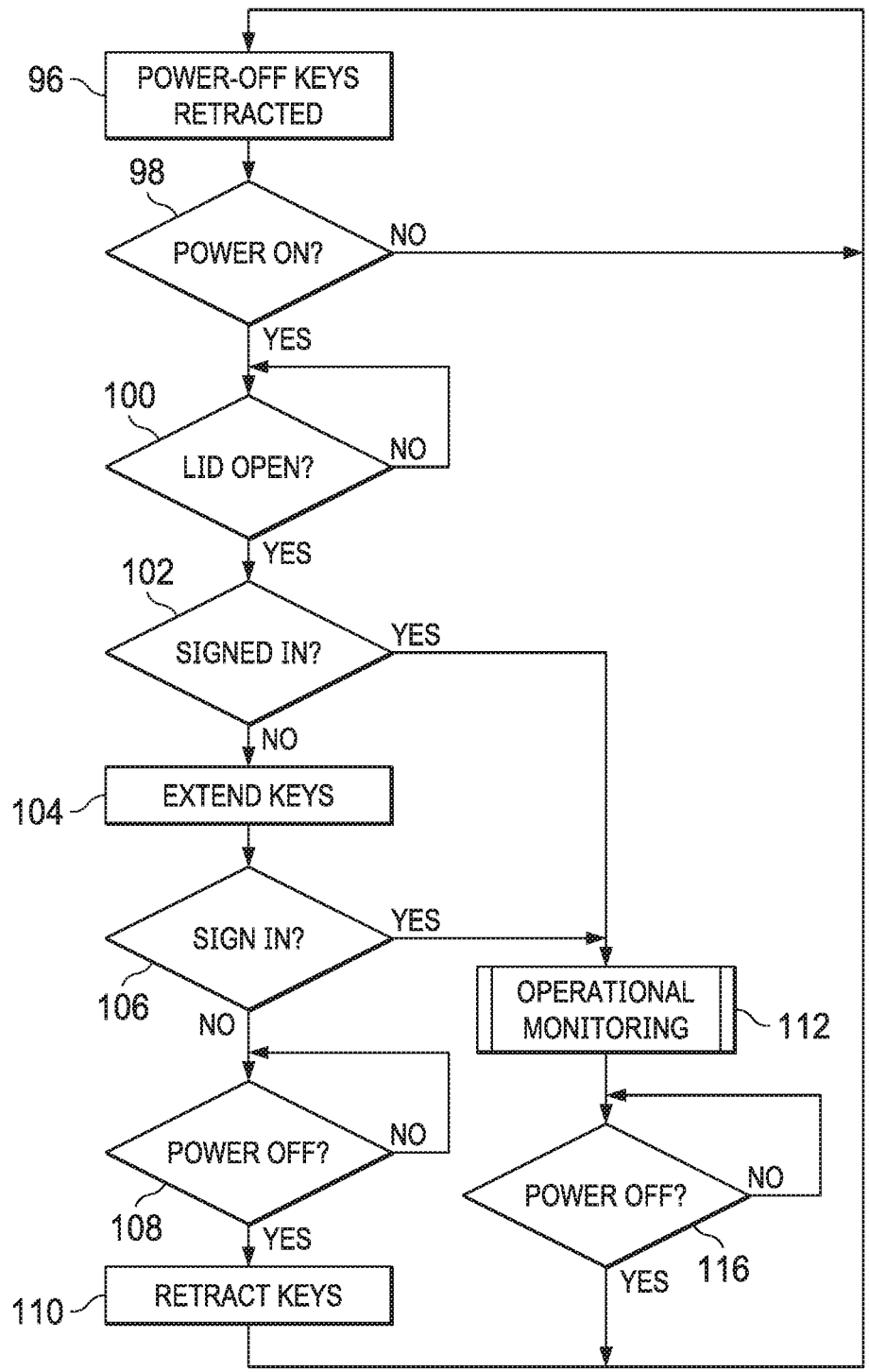
FIG. 6 depicts a flow diagram of a process for managing keyboard key positions.

Referring now to FIG. 6, a flow diagram depicts a process for managing keyboard key positions. The process starts at step 96 with the information handling system in a power off state having keyboard keys retracted. At step 98, the keyboard monitors for a transition to a power on state and, when a power on state is detected, proceeds to step 100. At step 100 a determination is made of whether the information handling system has a lid housing portion rotated to an open position so that the keys remain retracted until the housing lid rotates to an open position that exposes the keys for use by an end user. At step 102, once the keys are exposed with the lid in an open position, a determination is made of whether an end user is signed into the information handling system. If the end user is signed in, the process continues to step 112 to establish the keys as retracted or extended based upon operational monitoring conditions. At step 104 with the lid housing portion rotated open to expose the keys and the end user not signed in, the keys extend so that the end user may sign in. If at step 106 a successful sign in occurs, the process continues to step 112 for operational monitoring. If no sign in occurs, the process continues to step 108 to monitor for a power off of the information handling system. Once a power off is detected, the process continues to step 110 to retract the keys. Similarly at step 112, during operational monitoring, at step 116 monitoring determines if a power off of the information handling system takes place and, if so, the keys retract. Power off that results in key retraction may include a user selected power off, an automated power-saving power off, or a low battery condition so that the keys retract before the system shuts off due to a low battery.

Figure 7:
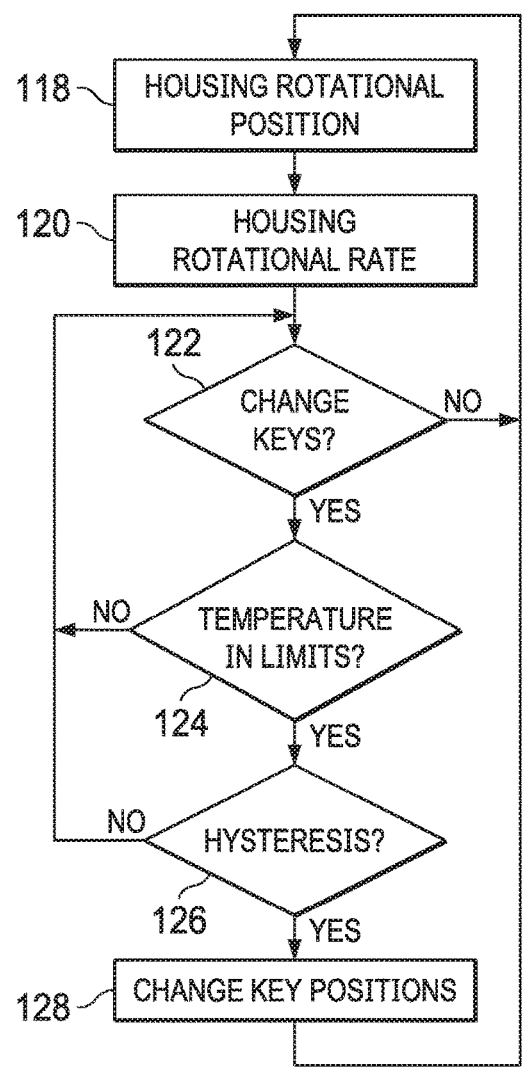
FIG. 7 depicts a flow diagram of a process for operational monitoring of conditions at an information handling system to manage key extension and retraction.

Referring now to FIG. 7, a flow diagram depicts a process for operational monitoring of conditions at an information handling system to manage key extension and retraction. The process starts at step 118 with measurement of the housing rotational position and step 120 with the measuring of housing rotational rate. In various embodiments other types of sensed conditions and sensors are used, such as a camera to watch end user interactions, a touch sensor to monitor user touches, a battery gauge to monitor system charge, the number and types of applications running on the system, the active selected application, screen timeout, wireless signals, etc. . . . . In one alternative embodiment, accelerometers measure housing portion rotational angles; in such a system, if accelerometer data becomes compromised as may happen when a system is held in a portrait orientation, key retraction may be implemented to ensure that damage will not occur to the keys if housing portions are closed while rotational orientation cannot be adequately determined. At step 122 a determination is made based upon the sensed conditions whether to change the key positions. If not, the process continues to monitor conditions. If a determination is made to change key positions, the process continues to step 124 to measure the temperature of the actuator wires and compare the measured temperature against defined limits. For instance, if a measured temperature indicates that an actuator wire is in a shortened state, then applying current to an opposing wire may result in system damage. As another example, a minimum cool down temperature may be enforced for the actuator wires after an actuation to help preserve the life of the actuator wire material. In some embodiments, a minimum time is enforced between actuations to help ensure adequate wire cooling. If the temperature of the actuator wire exceed a threshold, the process returns to step 122 to continue to check if a key position change is needed until the temperature of the actuator wires come into limits. At step 126 hysteresis is checked to ensure that the pending actuation does not follow too closely to a preceding actuation, such as might happen if a user rapidly reverses the direction of the housing rotation. For example, key retraction may have a reduced time delay from a previous actuation so that keys are not impacted if a housing closes over them, while some delay for key extension may be acceptable after a housing completes rotation to an open position. At step 128 current is applied to the appropriate set of actuator wires to implement a key retraction or extension. In essence, the keyboard manager predicts based upon available sensed inputs the key behavior desired by an end user and places the keys in the desired state while reducing unneeded or undesired actuations that wear on the key actuation system.

Figure 8:
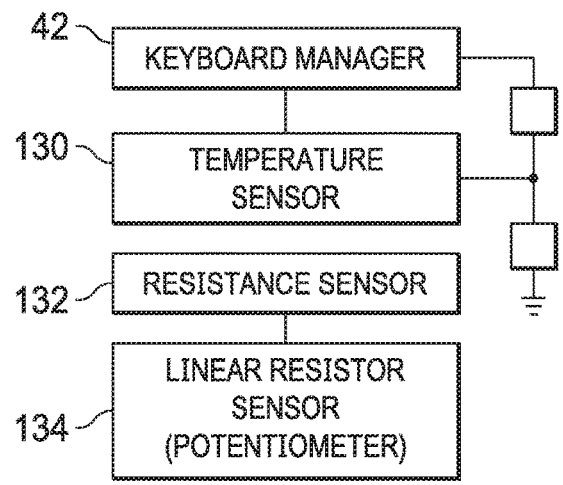
FIG. 8 depicts a block diagram of an information handling system keyboard key position manager.

Referring now to FIG. 8, a block diagram depicts an information handling system keyboard key position manager 42. In the example embodiment, keyboard manger 42 monitors three physical conditions to determine whether to apply current that actuates the actuator wires. A temperature sensor 130 measures actuator wire temperature to determine the phases of the actuator wire so that current is not applied while one or more actuator wires are in a shortened state. In particular, if an actuator wire for actuation is one direction is in a shortened state, application of current to actuator wires in an opposite direction may cause physical damage to the key actuation system as shortened actuator wires work against each other. In one alternative embodiment, keyboard manager 42 monitors temperature to control application of a cooling airflow over the actuator wires, such as with an air moving device aligned to direct cooling airflow across the actuator wires. In addition to checking actuator wire temperature, keyboard manager 42 checks the resistance across the actuator wires to ensure that current applied to the actuator wires is not grounded or sent across an open circuit. For example, before sending an actuation current that will heat the actuator wires, keyboard manager 42 sends a measuring current across the actuator wires and compares the current at the opposing end of the actuator wire with the applied current to determine if an expected resistance exists. Excessive resistance may indicate, for example, a failed or failing actuator wire that does not adequately carry current across its length. Insufficient resistance may indicate a broken wire in contact with ground or a grounded component that has come loose and into contact with the actuator wires. An advantage of measuring resistance across actuator wires is that the wires themselves may be implement without insulation.

By measuring actuator wire temperature and resistance before applying current to the actuator wires, keyboard manager 42 reduces the risk of damage associated with an inappropriate actuation, however, additional monitoring of conditions during actuation provides further safeguards against system damage. For example, during actuation as current is applied to actuator wires, keyboard manager 42 monitors temperature to ensure that an expected rise in temperature is experienced. If, after actuation current is applied, an expected rise in temperature is not experienced within a time limit, actuation current is removed so that actuator wire resistance may be checked again. In addition, position monitoring devices monitor key actuation structures for movement to ensure that adequate movement has taken place. For example, linear resistor sensors or potentiometers disposed along the sliding plate detect movement and compare detected movement with expected movement to ensure that actuation has taken place. In various embodiments, various types of movement sensing devices may report sliding plate movement in response to actuation, such as a Hall sensor and magnet on opposing moving portions or other types of limit switches. Since the shape memory actuation wires provide actuation at phase change in a rapid manner at defined temperatures, active monitoring of actuator wire temperature and sliding plate movement provide precise control points at which actuation current may be modified or shut off. That is, if an expected temperature rise and resistance exist at the actuator wires, cutting off current in the absence of movement may prevent system damage due to binding or other interference that prevents key actuation.

Figure 9:
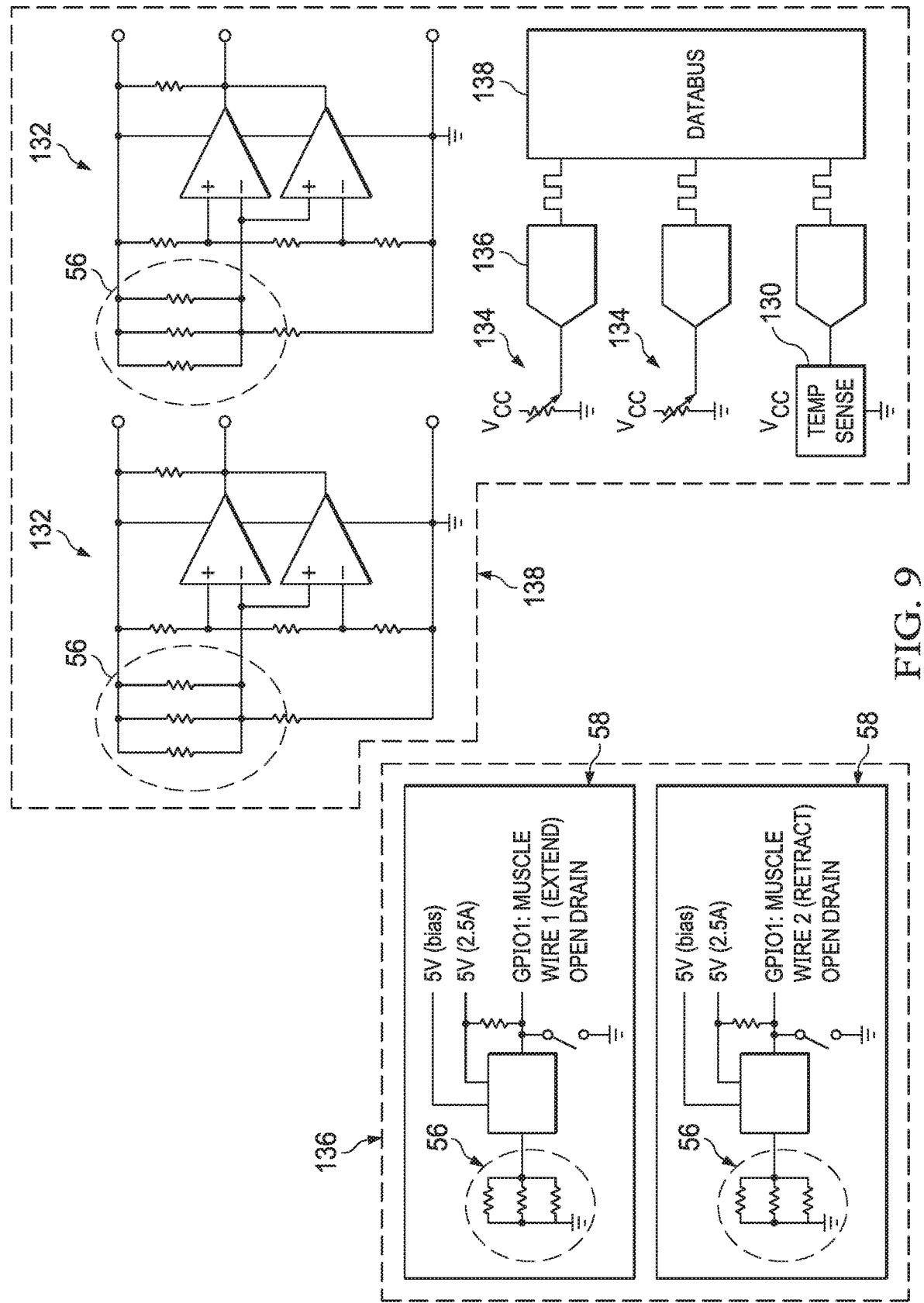
FIG. 9 depicts a circuit block diagram of an actuator wire circuit protected by a resistance sampling circuit.

Referring now to FIG. 9, a circuit block diagram depicts an actuator wire circuit 56 protected by a resistance sampling circuit 132. In the example embodiment, a key actuator drive circuit 136 has a first actuator wire set 56 that provides key retraction and a second actuator wire set 56 that provides key extension. Each actuator wire set 56 is monitored by its own resistance sampling circuit 132 that is isolated from drive circuit 136. Before drive current is applied to actuator wires 56, the resistance monitoring circuit 132 associated with the actuator wire set checks the resistance of the actuator wires, such as by applying a test current and comparing voltages. In alternative embodiments, other types of resistance measurements may be taken. The measured resistance is compared against an acceptable range to ensure that application of current to the actuation circuit will provide the correct heating to the actuation wires. If excessive resistance exists, damage to the actuator wire may be indicated so that actuation may result in breaking of the actuator wire. If low resistance exists, the actuator wire may have a premature interface with ground so that current applied to the actuator wire will not result in wire heating. Once current is passed through the actuator wires, linear potentiometers 134 measures the actual position of the sliding plate and provides position information through an analog-to-digital converter 136 to a databus 138. Similarly, temperature sensor 130 measures temperatures at the actuator wire and provides sensed temperature through an analog-to-digital converter to databus 138. In the example embodiment, since each actuator wire set 56 has a separate resistance monitoring circuit, control for retraction and extension of keys may be managed separately based on the resistance of each actuator wire set.

Figure 10:
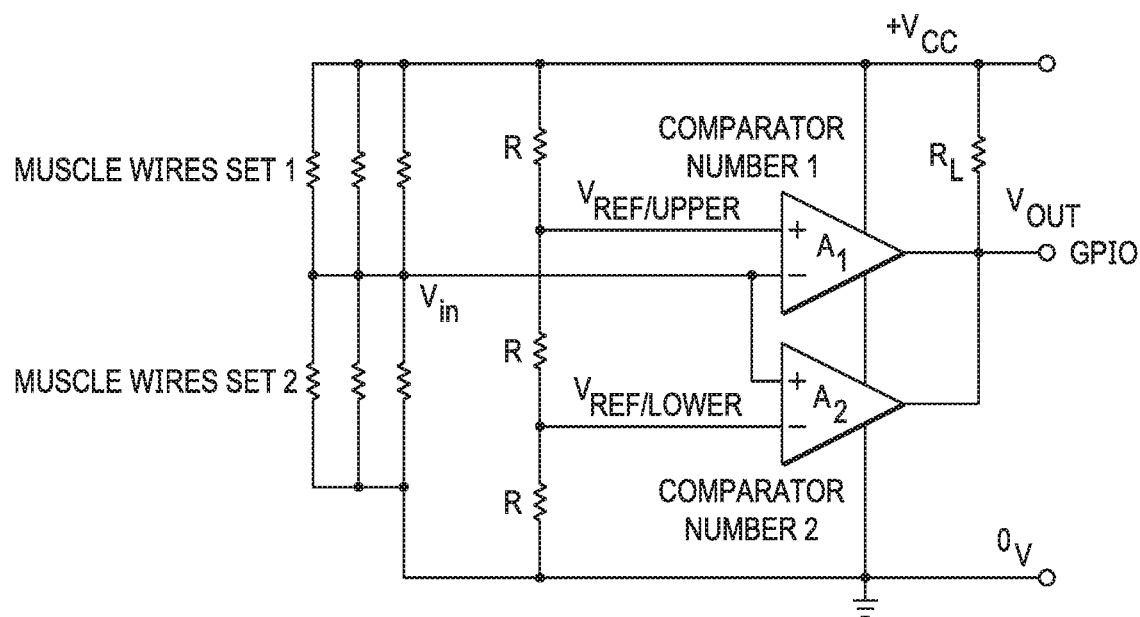
FIG. 10 depicts a circuit block diagram of both retraction and extension actuator wire sets protected by a common resistance sampling circuit.

Referring now to FIG. 10, a circuit block diagram depicts both retraction and extension actuator wire sets protected by a common resistance sampling circuit. Measuring resistance across both sets of actuator wires does not allow for isolation to a particular actuator set if an unacceptable resistance is detected, however, the use of one resistance measuring circuit reduces system cost and complexity. For example, if an actuator wire set proves unreliable for retraction, then even if separate measurements are available the system cannot be used for extension since the keys will essentially be stuck in an extended state without the ability to retract the keys.

Although the present invention has been described in detail, it should be understood that various changes, substitutions and alterations can be made hereto without departing from the spirit and scope of the invention as defined by the appended claims.

What is claimed is:

1. An information handling system comprising:
   a main housing;
   processing components disposed in the main housing and operable to execute instructions that process information;
   a keyboard coupled to the main housing, the keyboard having plural keys that move to accept inputs, the keys biased to extend out of the housing and moving into the housing in response to an end user press to accept end user inputs;
   one or more actuator wires coupled to the keyboard and interacting with the keyboard keys to selectively retract and extend the keyboard keys, the one or more actuator wires interacting with the keyboard keys by shortening in response to application of current; and
   a controller interfaced with the one or more actuator wires, the controller applying the current to retract and extend the keyboard keys based on one or more first predetermined conditions, the controller restricting application of current to the plural actuator wires based upon one or more second predetermined conditions.

2. The information handling system of claim 1 further comprising:

a first shuttle coupled to a first set of the one or more actuator wires and interacting with the keyboard keys to retract the keys; and a second shuttle coupled to a second set of the one or more actuator wires and interacting with the keyboard keys to extend the keys.

3. The information handling system of claim 2 wherein the first predetermined condition comprises a rate of movement of first and second housing portions relative to each other.

4. The information handling system of claim 2 wherein the one or more actuator wires comprise a shape memory alloy that transitions between austenite and martensite states.

5. The information handling system of claim 2 wherein the second predetermined condition comprises a temperature of the one or more actuator wires.

6. The information handling system of claim 5 further comprising an air moving device proximate the one or more actuator wires, the air moving device providing a cooling airflow to the one or more actuator wires when current is not applied to the one or more actuator wires and the one or more actuator wires exceed a predetermined temperature.

7. The information handling system of claim 6 wherein the air moving device comprises a piezo air moving device.

8. The information handling system of claim 6 wherein the air moving device comprises an electrostatic air mover.

9. The information handling system of claim 1 wherein the second predetermined condition comprises a minimum time period after the application of current to the one or more actuator wires.

10. A method for managing an information handling system keyboard configuration, the method comprising:
monitoring at the information handling system for a first set of one or more predetermined conditions associated with keyboard key position actuation;
monitoring at the information handling system for a second set of one or more predetermined conditions associated with restricting keyboard key position actuation;
detecting at least one of the first set of one or more predetermined conditions; and
in response to the detecting, applying current to one or more actuator wires, the current shortening the wire length to actuate the keyboard keys to the associated position;
wherein:
detecting at least one of the first of one or more predetermined conditions further comprises detecting rotation of housing portions relative to each other towards a closed configuration; and
applying current to the one or more wire actuators further comprises shortening a wire length to retract the keyboard keys; and
the first one or more predetermined conditions further comprises a rate of rotation and applying current further comprises applying current a predetermined time before the rotation reaches the closed configuration based upon an angle of rotation and the rate of rotation.

11. The method of claim 10 further comprising:
detecting at least one of the first of one or more predetermined conditions further comprises detecting rotation of housing portions relative to each other towards away from a closed configuration; and applying current to the one or more wire actuators further comprises shortening a wire length to extend the keyboard keys after the rotation of the housing portions stops.

12. The method of claim 10 further comprising removing the current upon detection of the keyboard key actuation completion.

13. A method for managing an information handling system keyboard configuration, the method comprising:
monitoring at the information handling system for a first set of one or more predetermined conditions associated with keyboard key position actuation;
monitoring at the information handling system for a second set of one or more predetermined conditions associated with restricting keyboard key position actuation;
detecting at least one of the first set of one or more predetermined conditions; and
in response to the detecting, applying current to one or more actuator wires, the current shortening the wire length to actuate the keyboard keys to the associated position;
detecting at least one of the second set of one or more predetermined conditions, the second set of one or more predetermined conditions including a temperature threshold;
in response to the detecting, restricting the applying current to the one or more actuator wires until the second set of one or more predetermined conditions changes;
removing the current upon detection of keyboard actuation completion; and
applying a cooling airflow to the one or more actuator wires upon removing the current.

14. A keyboard comprising:
plural keys arranged to accept end user key inputs;
first and second shuttles interfaced with the keys, the first shuttle to move the keys to a retracted position, the second shuttle to release the keys to an extended position;
a first set of plural actuator wires shortening in response to application of current to move the shuttle to the retracted position; and
a second set of plural actuator wires shortening in response to application of current to pull the sliding plate to the extended position; and
a keyboard manager interfaced with the first and second sets of plural actuator wires, the keyboard manager applying current in response to a first set of predetermined conditions and restricting the applying of current if the first set of predetermined conditions occur during a second set of predetermined conditions.

15. The keyboard of claim 14 wherein:
the first set of predetermined conditions comprises an angular relationship between first and second housing portions and a rate of change of the angular relationship; and
the second set of predetermined conditions comprises a temperature of one or more of the actuator wires.

16. The keyboard of claim 15 further comprising an air moving device aligned to provide cooling airflow to the one or more actuator wires if the temperature of the one or more actuator wires exceeds a threshold.

* * * * *